Oct. 16, 1928.

K. LUBOWSKY 1,687,575

ELECTRIC MEASURING SYSTEM

Filed Dec. 2, 1926

Inventor:
Kurt Lubowsky,
by
His Attorney.

Patented Oct. 16, 1928.

1,687,575

UNITED STATES PATENT OFFICE.

KURT LUBOWSKY, OF BERLIN, GERMANY, ASSIGNOR TO GENERAL ELECTRIC COMPANY, A CORPORATION OF NEW YORK.

ELECTRIC MEASURING SYSTEM.

Application filed December 2, 1926, Serial No. 152,271, and in Germany January 15, 1926.

My invention relates to electric measuring systems and in particular to such a system which is adapted to obtain a measurement which varies at some predetermined power, other than the first power, of another variable.

One practicable application of this invention is its use in investigating the efficiency of wind power plants and the like. It is known that the mechanical energy supplied to the wind wheel by the wind is not proportional to the first power of the wind speed but rather is proportional to the third power of the wind speed. The wind speed is a variable factor over which there is no control. These conditions have made it practically impossible to obtain reliable test results by methods previously employed. By means of my invention I can obtain an integration of the wind speed raised to the third power and thus obtain a measurement which is always proportional to the input energy of such a power plant in such form that it can be directly compared to the output energy of an electric generator driven by the wind motor.

The invention has other applications and the measurement is not limited to any particular power such as the third power of the variable quantity. In fact this factor may be adjustable in any given installation. In carrying my invention into effect I prefer to employ an electric generator driven at a speed proportional to one variable quantity such as to obtain a voltage proportional to the first power of the variable. Across this generator I connect one or more measuring circuits containing an ordinary type of electric measuring device and a resistance having a negative characteristic of such value as to make the voltage impressed upon the meter vary as the desired power of the variable quantity.

The features of my invention which are believed to be novel and patentable will be pointed out in the claims appended hereto. For a better understanding of my invention reference is made in the following description to the accompanying drawing in which Fig. 1 shows the application of the invention to integrating a quantity proportional to the power input to a wind motor; and Fig. 2 shows the invention applied to an indicating measurement in which the system is adjustable for different power exponents.

Figure 1:
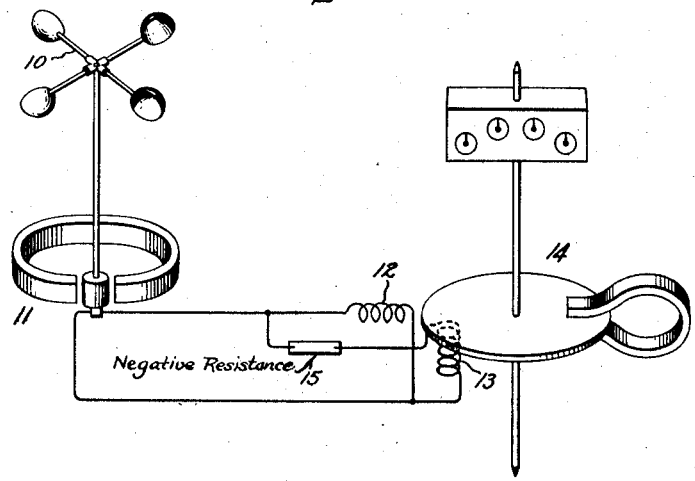

Referring to Fig. 1, 10 represents an anemometer which is intended to be placed in the path of the wind adjacent the point of investigation so that it will be driven at a speed proportional to the wind speed. This anemometer drives a small electric generator or magneto represented at 11 at a corresponding speed. The generator is designed to give a voltage proportional to its speed and is connected to energize the voltage coil 12 and the current coil 13 of an integrating wattmeter 14. The potential coil 12 is connected directly across the generator and will produce a torque component proportional to the first power of the wind speed. The current coil 13 is connected across the generator through a device 15 having a negative resistance characteristic such as to make the current in coil 13 vary as the square of the generator voltage. Boron has this property and the device 15 may be a rod of boron, or a mixture of boron and some other material which will give the desired effect. For example, the addition of a small amount of carbon increases the initial conductivity of the boron and lowers its extreme negative resistance characteristic to an extent depending upon the amount of carbon added, as explained in United States patent to Weintraub 1,019,393. The resistance of coil 13 should be small as compared to the minimum resistance of the device 15 so that the latter always constitutes the predominating resistance of the circuit. By this arrangement the meter is caused to rotate as the third power of the generator voltage and consequently will integrate a quantity proportional to the power input of a wind motor which is driven by the same wind current to which the anemometer 10 is exposed. The maximum load imposed by generator 11 should be small as compared to the motor capacity of the anemometer so that its speed will always be proportional to the wind speed.

Figure 2:
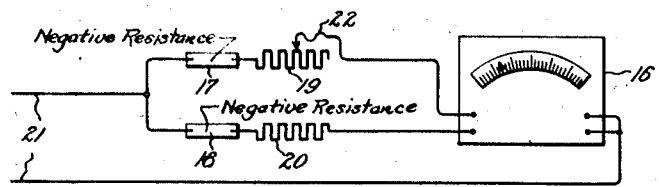

In Fig. 2 the meter 16 is shown as being of the indicating type and negative resistance devices 17 and 18 are contained in both the voltage and current circuits of the meter. Ordinary resistances 19 and 20 are also contained in these circuits and the power exponent of these circuits will be determined by the resultant characteristic of the two series resistances. In this case if the meter is to give a reading proportional to the third power of the applied voltage at 21, the power exponent of each circuit may be made equal to 1.5, or some other value, such that their sum equals 3. One or both of the resistances 19 and 20 may be made adjustable as represented at 22 for the purpose of getting the resultant exponent correct.

In accordance with the provisions of the patent statutes I have described the principle of operation of my invention, together with the apparatus which I consider to represent the best embodiment thereof; but I desire to have it understood that the apparatus shown and described is only illustrative and that the invention may be carried out by other means.

What I claim as new and desire to secure by Letters Patent of the United States, is:

1. A measuring system comprising a source of variable voltage, an electric measuring device supplied thereby and a device having a negative resistance characteristic connected between said source and measuring device to cause the latter to give a measurement which varies with some predetermined power other than the first power of the variable voltage.

2. A measuring system comprising a source of variable voltage, an electric measuring device and a boron resistor connected between said source and measuring device to cause the instrument to give a measurement which varies with some power greater than the first power of the variable voltage.

3. A measuring system comprising a source of variable voltage, a wattmeter having current and voltage coils, connections for supplying said coils from said variable voltage source and a negative resistance device in series with at least one of said coils to cause said wattmeter to give a measurement which varies at some power in excess of the square of the variable voltage.

4. A measuring system comprising a source of variable voltage, a wattmeter having current and voltage coils, connections for supplying said coils from said source, and means included in said circuit connections for causing the wattmeter to give a measurement proportional to the third power of the variable voltage.

5. A measuring system comprising an anemometer, an electric generator driven thereby, an integrating wattmeter having its energizing coils energized from said generator and a negative resistance device included in circuit with at least one of the energizing coils of the wattmeter to cause the measurement to be proportional to the third power of the speed of said anemometer.

In witness whereof, I have hereunto set my hand this 15th day of November, 1926.

Dr. Ing. KURT LUBOWSKY.